United States Patent
Chen et al.

(10) Patent No.: US 12,099,422 B2
(45) Date of Patent: Sep. 24, 2024

(54) METHOD AND ELECTRONIC DEVICE FOR STORAGE TESTING

(71) Applicant: Dell Products L.P., Round Rock, TX (US)

(72) Inventors: Chi Chen, Chengdu (CN); Changyue Dai, Sichuan (CN); En Shi, Chengdu (CN); Hailan Dong, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/104,553

(22) Filed: Feb. 1, 2023

(65) Prior Publication Data

US 2024/0028492 A1 Jan. 25, 2024

(30) Foreign Application Priority Data

Jul. 22, 2022 (CN) .......................... 202210872108.4

(51) Int. Cl.
*G06F 11/00* (2006.01)
*G06F 11/22* (2006.01)

(52) U.S. Cl.
CPC ........ *G06F 11/221* (2013.01); *G06F 11/2273* (2013.01)

(58) Field of Classification Search
CPC .......................... G06F 11/221; G06F 11/2273
USPC ....................................................... 714/1–57
See application file for complete search history.

(56) References Cited

U.S. PATENT DOCUMENTS

| | | | |
|---|---|---|---|
| 6,385,665 B1 * | 5/2002 | Canady | H04L 41/0686 714/48 |
| 7,155,587 B2 * | 12/2006 | Eguchi | G06F 3/061 714/47.2 |
| 10,872,293 B2 | 12/2020 | Dunning et al. | |
| 2009/0024869 A1 * | 1/2009 | Kitamura | G06F 9/505 714/E11.002 |
| 2015/0205639 A1 * | 7/2015 | Matsumoto | G06F 9/5016 718/104 |
| 2018/0121766 A1 | 5/2018 | McCord et al. | |
| 2020/0342979 A1 | 10/2020 | Sadowsky et al. | |
| 2021/0007023 A1 | 1/2021 | Umapathy et al. | |

* cited by examiner

*Primary Examiner* — Sarai E Butler
(74) *Attorney, Agent, or Firm* — BainwoodHuang (57) ABSTRACT

Techniques for storage testing involve: acquiring a first state of a storage system including first input/output (IO) load information; taking a first action based on the first state, the first action causing the first IO load information to be changed to second IO load information; updating the first action to be a reserved action for the first state if it is obtained based on the second IO load information that the storage system reaches a preset condition; and obtaining an action combination of a plurality of IO load information changes based on a plurality of reserved actions corresponding to a plurality of states, wherein the plurality of states include the first state. Accordingly, the most effective load combination change mode for the storage system can be found automatically and more accurately, so as to find more vulnerabilities of the storage system, thereby improving the efficiency of storage system testing.

20 Claims, 5 Drawing Sheets

METHOD AND ELECTRONIC DEVICE FOR STORAGE TESTING

CROSS-REFERENCE TO RELATED APPLICATION

This application claims priority to Chinese Patent Application No. CN202210872108.4, on file at the China National Intellectual Property Administration (CNIPA), having a filing date of Jul. 22, 2022, and having "A METHOD AND ELECTRONIC DEVICE USED FOR STORING TESTS" as a title, the contents and teachings of which are herein incorporated by reference in their entirety.

TECHNICAL FIELD

Embodiments of the present disclosure relate to the field of storage technologies, and more specifically, to a method and an electronic device for storage testing.

BACKGROUND

When a storage system is tested, a stress test may be performed on the system with different storage input/output (IO) workloads and combinations thereof to find more vulnerabilities. Compared with a stable storage IO workload, combining storage IO workloads in a changing manner may exert stress on the storage system more effectively. Different storage systems have different hardware and software configurations, and therefore, it is very difficult for a tester to exactly find the most effective load change mode for each storage system.

SUMMARY OF THE INVENTION

According to example embodiments of the present disclosure, a method for storage testing is provided for performing storage performance testing automatically.

In a first aspect of the present disclosure, a method is provided, the method including: acquiring a first state of a storage system including first input/output (IO) load information; taking a first action based on the first state, the first action causing the first IO load information to be changed to second IO load information; updating the first action to be a reserved action for the first state if it is obtained based on the second IO load information that the storage system reaches a preset condition; and obtaining an action combination of a plurality of IO load information changes based on a plurality of reserved actions corresponding to a plurality of states, wherein the plurality of states include the first state.

By implementing the method provided in the first aspect, the most effective load combination change mode for the storage system can be found automatically and more accurately, so as to find more vulnerabilities in the storage system, thereby improving the efficiency of testing the storage system.

In some embodiments of the first aspect, storage performance testing is performed based on the second IO load information to obtain a first empirical value, wherein the first empirical value represents a degree of impact on the performance of the storage system by taking the first action in the first state. The first action is updated to be the reserved action for the first state if the first empirical value is the largest value among a plurality of known empirical values of the first state, wherein the reserved action for the first state is an action that has the greatest impact on the performance of the storage system among a plurality of actions taken in the first state, the plurality of actions include the first action, and the action combination indicates a combination of a plurality of IO load information changes that have the greatest impacts on the performance of the storage system in the plurality of states.

In some embodiments of the first aspect, the reserved action for the first state is a known optimal action in the first state, a random action is taken with a first probability value and the known reserved action for the first state is taken with a second probability value if it is detected that the first state is a known state, wherein the first probability value and the second probability value are greater than or equal to 0 and less than or equal to 1, the first probability value is configured to decrease over time, and the second probability value is configured to increase over time. A random action is taken if it is detected that the first state is an unknown state.

In some embodiments of the first aspect, the reserved action for the first state is a known optimal action in the first state, and the known reserved action for the first state is taken if it is detected that the first state is a known state. A random action is taken if it is detected that the first state is an unknown state.

In some embodiments of the first aspect, the first action is taken based on the first state to obtain a second state, the second state including the second IO load, and the plurality of states including the second state. A second action is taken based on the second state, the second action causing the second IO load to be changed to a third IO load. The second action is updated to be a reserved action for the second state if it is obtained based on the third IO load information that the storage system reaches the preset condition.

In some embodiments of the first aspect, the storage testing is terminated if it is detected that a preset testing target is achieved, and the achievement of the preset testing target includes one or more of the following: reaching a predetermined threshold of central processing unit (CPU) utilization, reaching a predetermined threshold of memory utilization, reaching a predetermined threshold of IO latency, or discovering a critical defect including a data miss compare or a data path failure The storage testing is terminated if it is detected that the number of attempts of the first action reaches a preset maximum value.

In some embodiments of the first aspect, the first state further includes one or more of the following parameters: hardware information, platform information, and drive information of a storage testing system, load type, load thread, and load profile of storage IO, and total number of input/output operations per second (TOPS), CPU utilization, memory utilization, IO latency, and current event during running of the storage testing, the load profile including deduplication, block size, and read/write ratio, and the current event including no event, redundant array of independent disks (RAID) rebuilding, system space exhaustion and recovery, snapshot creation/deletion, data simplification tag on/off, synchronously triggered replication, logical unit access (LUN) switching, and storage processor restart.

In some embodiments of the first aspect, the taking a first action includes one or more of the following: no action, modifying a load type, modifying a load thread, modifying a load profile, and injecting a special event, the special event including RAID rebuilding, system space exhaustion and recovery, snapshot creation/deletion, data simplification tag on/off, synchronously triggered replication, LUN switching, and storage processor restart.

In some embodiments of the first aspect, parameters indicating the performance of the storage system include one or more of the following: CPU utilization, memory utilization, IO latency, data miss compare, and data path failure.

In a second aspect of the present disclosure, an electronic device is provided. The electronic device includes: a processor; and a memory coupled to the processor and having instructions stored therein, wherein the instructions, when executed by the electronic device, cause the electronic device to perform operations including: acquiring a first state of a storage system including first IO load information; taking a first action based on the first state, the first action causing the first IO load information to be changed to second IO load information; updating the first action to be a reserved action for the first state if it is obtained based on the second IO load information that the storage system reaches a preset condition; and obtaining an action combination of a plurality of IO load information changes based on a plurality of reserved actions corresponding to a plurality of states, wherein the plurality of states include the first state.

By implementing the electronic device provided in the second aspect, the most effective load combination change mode for the storage system can be found automatically and more accurately, so as to find more vulnerabilities in the storage system, thereby improving the efficiency of testing the storage system.

In some embodiments of the second aspect, storage performance testing is performed based on the second IO load information to obtain a first empirical value, wherein the first empirical value represents a degree of impact on the performance of the storage system by taking the first action in the first state. The first action is updated to be the reserved action for the first state if the first empirical value is the largest value among a plurality of known empirical values of the first state, wherein the reserved action for the first state is an action that has the greatest impact on the performance of the storage system among a plurality of actions taken in the first state, the plurality of actions include the first action, and the action combination indicates a combination of a plurality of IO load information changes that have the greatest impacts on the performance of the storage system in the plurality of states.

In some embodiments of the second aspect, the reserved action for the first state is a known optimal action in the first state, a random action is taken with a first probability value and the known reserved action for the first state is taken with a second probability value if it is detected that the first state is a known state, wherein the first probability value and the second probability value are greater than or equal to 0 and less than or equal to 1, the first probability value is configured to decrease over time, and the second probability value is configured to increase over time. A random action is taken if it is detected that the first state is an unknown state.

In some embodiments of the second aspect, the reserved action for the first state is a known optimal action in the first state, and the known reserved action for the first state is taken if it is detected that the first state is a known state. A random action is taken if it is detected that the first state is an unknown state.

In some embodiments of the second aspect, the operations further include that: the first action is taken based on the first state to obtain a second state, the second state including the second IO load, and the plurality of states including the second state. A second action is taken based on the second state, the second action causing the second IO load to be changed to a third IO load. The second action is updated to be a reserved action for the second state if it is obtained based on the third IO load information that the storage system reaches the preset condition.

In some embodiments of the second aspect, the operations further include that: the storage testing is terminated if it is detected that a preset testing target is achieved, and the achievement of the preset testing target includes one or more of the following: reaching a predetermined threshold of central processing unit (CPU) utilization, reaching a predetermined threshold of memory utilization, reaching a predetermined threshold of IO latency, or discovering a critical defect including a data miss compare or a data path failure The storage testing is terminated if it is detected that the number of attempts of the first action reaches a preset maximum value.

In some embodiments of the second aspect, the first state further includes one or more of the following parameters: hardware information, platform information, and drive information of a storage testing system, load type, load thread, and load profile of storage IO, and total IOPS, CPU utilization, memory utilization, IO latency, and current event during running of the storage testing, the load profile including deduplication, block size, and read/write ratio, and the current event including no event, RAID rebuilding, system space exhaustion and recovery, snapshot creation/deletion, data simplification tag on/off, synchronously triggered replication, LUN switching, and storage processor restart.

In some embodiments of the second aspect, the taking a first action includes one or more of the following: no action, modifying a load type, modifying a load thread, modifying a load profile, and injecting a special event, the special event including RAID rebuilding, system space exhaustion and recovery, snapshot creation/deletion, data simplification tag on/off, synchronously triggered replication, LUN switching, and storage processor restart.

In some embodiments of the second aspect, parameters indicating the performance of the storage system include one or more of the following: CPU utilization, memory utilization, IO latency, data miss compare, and data path failure.

In a third aspect of the present disclosure, a computer program product is provided, the computer program product is tangibly stored in a computer-readable medium and includes machine-executable instructions, wherein the machine-executable instructions, when executed, cause a machine to perform the method according to the first aspect of the present disclosure.

In a fourth aspect of the present disclosure, a computer-readable storage medium having a computer program stored thereon is provided, wherein the computer program, when executed by a device, causes the device to perform the method according to the first aspect of the present disclosure. As can be seen from the above description, according to the solutions of various embodiments of the present disclosure, the most effective load combination change mode for a storage system can be found automatically and more accurately, so as to find more vulnerabilities in the storage system, thereby improving the efficiency of testing the storage system.

It should be understood that the Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

DETAILED DESCRIPTION

The individual features of the various embodiments, examples, and implementations disclosed within this document can be combined in any desired manner that makes technological sense.

Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described in more detail below with reference to the accompanying drawings. Although the drawings show some embodiments of the present disclosure, it should be understood that the present disclosure can be implemented in various forms, and should not be explained as being limited to the embodiments stated herein. Instead, these embodiments are provided for understanding the present disclosure more thoroughly and completely. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Stress testing is to simulate a software and hardware environment of an actual application and a system load during use by a user, and run a test case for a long time or with a large load, thereby testing the performance, reliability, and stability of a system under test. Stress testing may also be referred to as strength testing and load testing. Repeatable load testing is performed in a manner of imposing an anomalous (such as long-time peaks) quantity, frequency, or resource, for checking the resistance of a system to anomalous conditions, and finding a system performance bottleneck or other instability issues.

In stress testing of a storage system, one or more of the following storage IO workloads (also referred to as loads for short) may usually be used to stress the storage system, including block IO, file IO, virtual machine (ESXi) IO, database IO, host control interface (HCI) IO, other storage IOs, or the like. One or more of the following load profiles may be set for each storage IO, including deduplication, compression, block size, read/write ratio, or other load profiles. In a storage system, a storage IO path includes cache, internal buffer, pool, redundant array of independent disks (RAID), back-end driver, or another IO path. The storage system performance may be represented by one or more of the following metrics, including central processing unit (CPU) utilization, memory utilization, IO latency, data miss compare (DMC), data path failure, and the like.

Different storage IO load levels, different IO load combinations, or different IO load profile change modes may have different effects on the IO path of the storage system, and may also apply dynamically changing stresses to the cache, IO queue, and task of the IO path. These changes may expose more vulnerabilities of the storage system. It is studied and found in the present disclosure that, in storage system testing, using a changing IO load may have a greater impact on the performance of the storage system than the impact that a stable IO load may have. If all storage IO loads used in the testing are stable, more client terminals may be required to stress the storage IOs, and the most effective storage IO load configuration may not be found; therefore, the testing is less efficient. Hardware and software configurations of different storage systems are different, and therefore, it is necessary to accurately find the most effective storage IO load configuration mode for different storage systems. The storage IO load configuration mode may include change modes of parameters such as storage IO load level, storage IO load combination, and storage IO load profile, and combinations thereof.

In the embodiments of the present disclosure, a reinforcement learning-based method and electronic device for storage testing are proposed, which are used for automatically performing storage performance testing. The method may include: acquiring a first state of a storage system including first input/output (IO) load information; taking a first action based on the first state, the first action causing the first IO load information to be changed to second IO load information; updating the first action to be a reserved action for the first state if it is obtained based on the second IO load information that the storage system reaches a preset condition; and obtaining an action combination of a plurality of IO load information changes based on a plurality of reserved actions corresponding to a plurality of states, wherein the plurality of states include the first state. In some embodiments, an action that has the greatest impact on the performance of the storage system in each state in the storage system can be tested, calculated, and continuously updated for many times as the reserved action corresponding to that state. An action applied to the state may be implemented as an operation of changing an IO load parameter, and a set of a plurality of reserved actions corresponding to a plurality of states may form an optimal action trajectory, so as to automatically find the storage IO load change mode that has the greatest impact on the performance of the storage system.

By implementing the embodiments of the present disclosure and based on reinforcement learning, the most effective storage IO change modes may be found for different storage systems, including storage IO load levels, storage IO load combinations, storage IO load profiles, their combinations, and the like. Using the most effective storage IO change mode may have the greatest impact on the performance of the storage system. The storage system is stressed with the found most effective load combination change mode, learning is continuously performed as the storage system runs, and testing results are continuously evaluated. Design is improved for the testing, testing experiences are shared to help with upcoming test tasks, and learning update is kept to improve the testing efficiency and cause the test system to find more vulnerabilities. In addition, compared with relying on manual testing experience, using the method in the embodiments of the present disclosure can automatically and more accurately find the most effective load combination change mode for the storage system, so as to find more vulnerabilities in the storage system, thereby improving the efficiency of storage system testing.

In some embodiments of the present disclosure, reinforcement learning refers to simulating or emulating a human brain to learn in a trial-and-error manner, so that an agent acts based on an environment, and under the stimulation of reward or punishment provided in the environment, anticipation of stimulation is formed gradually through continuous learning from mistakes and continuous attempts, and habitual behaviors that can obtain the greatest benefit are generated, so as to obtain the maximum expected benefit. Specifically, the reinforcement learning is a machine learning method that maximizes the reward obtained by the agent in the process of interacting with the environment. The interaction here refers to a process in which the agent obtains a state from the environment and outputs an action, and then the environment outputs a reward according to the action and gives the agent a next state, thereby cycling for iteration. In a reinforcement learning structure, the agent may refer to a subject of the reinforcement learning, the environment may refer to an object of the reinforcement learning, the action may refer to a behavioral representation of the agent, the state may refer to information obtained by the agent from the environment, and the strategy may refer to a mapping function by which the agent determines a next action based on the state. The reward may refer to a feedback of the environment to the action of the agent, and the reward may feed back whether a certain action taken by the agent at a certain step is beneficial, as well as the magnitude of the beneficial degree. Return may refer to an accumulated long-term reward after the current moment, and it may also be referred to as a cumulative future reward, which represents a possibility of reaching a testing target in the future, even if the testing target may not be reached immediately after the current action is taken. A discount factor is generally added to an expected reward. The reinforcement learning requires a trade-off between short-term rewards and long-term rewards, allowing the agent to obtain more long-term rewards. At the beginning of the reinforcement learning, a random strategy is often used for experiments to obtain a series of state, action, and reward samples. An algorithm continuously improves the strategy according to the samples, and a learning target is to maximize long-term rewards.

Furthermore, the target of the reinforcement learning is to learn a strategy that maximizes the expectation, that is, the agent is expected to perform a series of actions to obtain as many long-term rewards as possible. To evaluate the long-term return of a strategy, a state-action value function is defined $Q(s, a)$. The state-action value function $Q(s, a)$ represents the long-term reward obtained after performing an action a in a state s. The purpose of calculating the state-action value function $Q(s, a)$ is to construct a learning algorithm to obtain the optimal strategy from the data, each strategy corresponds to a state-action value function $Q(s, a)$, the optimal strategy corresponds to the optimal $Q(s, a)$ value, and the optimal $Q(s, a)$ value is the maximum value. Solving the optimal strategy is equivalent to solving the optimal value function, which is a method of solving the optimal strategy, and is referred to as a learning method based on the value function. The experience $Q(s, a)$ will become increasingly more accurate with each iteration of learning and training, and if the update is performed enough times, it will converge and represent the true Q value.

Performing different actions in state $S_t$ may obtain different Q values. In an example, after action A1 is taken in state S1, it will turn to state S2, but there is no possibility to reach, through state S2, a testing target from experiences gained so far, such as finding a critical defect or having reached a predetermined threshold for CPU utilization/memory utilization/IO latency. Therefore, the resulting $Q(S1, A1)$ value is 0, which means that action A1 has no corresponding long-term value. After action A2 is taken in state S1, it will turn to state S3. The testing target is not reached in state S3, but an upcoming action from state S3 eventually leads to the testing target being reached, and therefore, action A2 has a long-term value instead of a short-term value, and the resulting $Q(S1, A2)$ value is a small value 2. After action A3 is taken in state S1, the testing target is achieved immediately, for example, finding a critical defect or having reached a predetermined threshold for CPU utilization/memory utilization/IO latency, and the resulting $Q(S1, A3)$ value is a large value 10. However, whether the testing target is achieved, the experience of each attempted action will benefit future decisions of the agent.

The value function is an evaluation of a strategy, and in order to perform optimization continuously until the optimal strategy is selected, a feasible method is to select a strategy updating method according to the value function. Common strategies include exploitation strategy, exploration strategy, compromise strategy between exploration and exploitation, and combined strategies thereof. The exploitation strategy is a deterministic strategy, that is, no new action is tried, and a known action strategy that maximizes the value function is always adopted. This is the use of known learning knowledge by the agent, which is not conducive to updating a better $Q(s, a)$ value, but can obtain a better testing result to judge whether the algorithm is effective. The exploration strategy is a random strategy, that is, completely random actions are taken to try to explore, which means exploration of unknown learning knowledge by the agent. Exploring unknown actions will generate unknown effects, which is conducive to updating $Q(s, a)$ value. It is possible to gradually filter and adopt the best action to obtain a better strategy, but the process is lengthy. The compromise strategy between exploration and exploitation may balance exploration and exploitation, adopt an exploration strategy with probability ε, and adopt an exploitation strategy with probability 1-ε.

Figure 1:
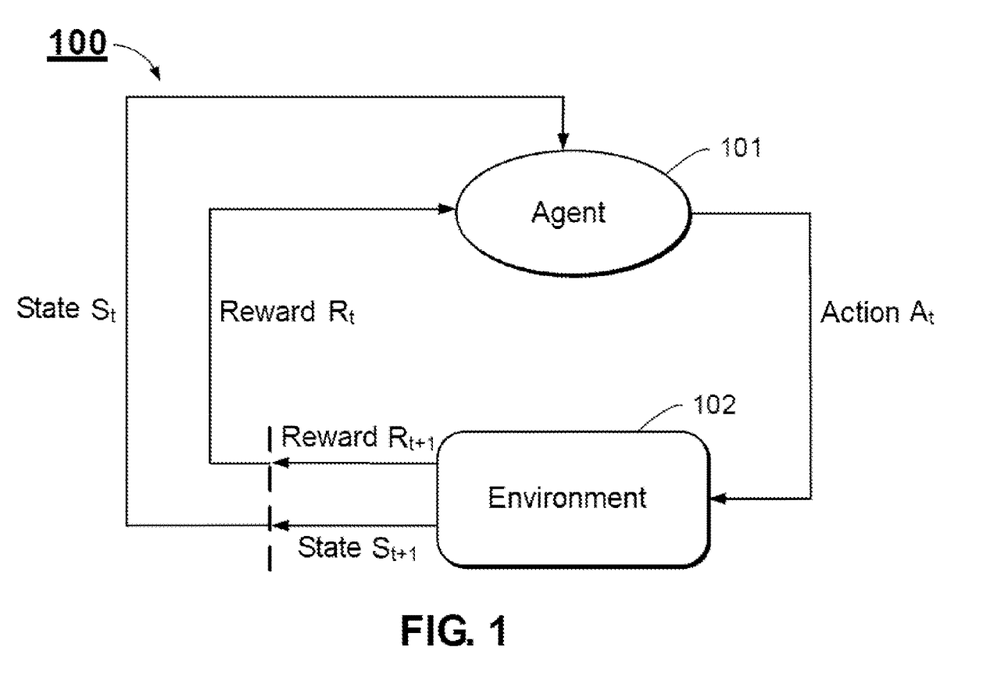
FIG. 1 shows a schematic diagram of a reinforcement learning structure according to some embodiments of the present disclosure.

FIG. 1 shows reinforcement learning structure 100. Referring to FIG. 1, in reinforcement learning structure 100, at time t, agent 101 acquires states $S_t$ and $R_t$ from environment 102, agent 101 selects action $A_t$ based on an action selection strategy, and environment 102 outputs reward $R_{t+1}$ to agent 101 according to action $A_t$, and at next time t+1, changes to next state $S_{t+1}$. At time t+1, agent 101 obtains state $S_{t+1}$ from environment 102 again, agent 101 selects action $A_{t+1}$ based on the action selection strategy, and environment 102 outputs reward $R_{t+2}$ to agent 101 according to action $A_{t+1}$, and at next time t+2, changes to next state $S_{t+2}$, and so on. By analogy, the learning process iterates continuously to update the state-action value function Q(s, a), and the function Q(s, a) defines an expected value of a long-term reward for taking action a in state s. The agent learns continuously over time to pursue an action strategy that maximizes the long-term reward in any state. It should be noted that the embodiments of the present disclosure do not impose any limitations on the reinforcement learning algorithm used by the agent, including but not limited to Q-learning algorithm, deep Q-network (DQN) algorithm, double-deep Q-network (DDQN) algorithm, and the like.

Figure 2:
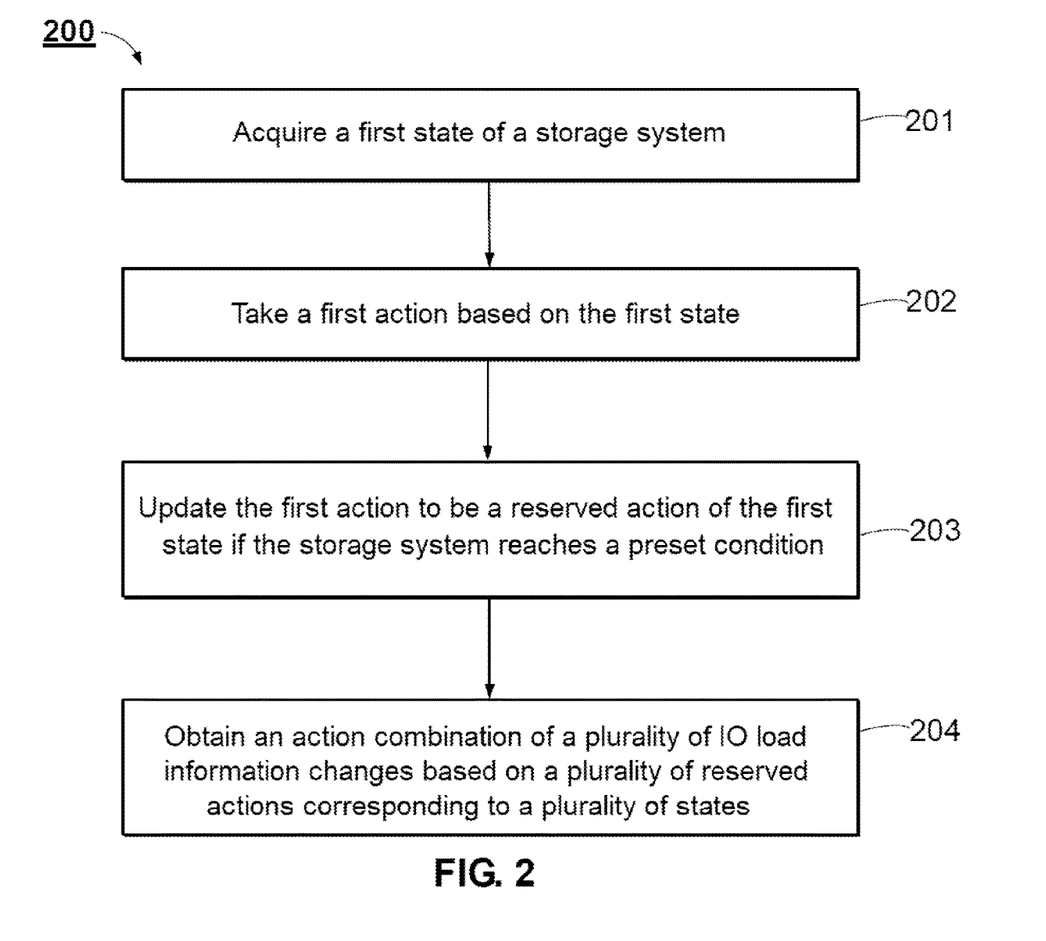
FIG. 2 shows a flow chart of a method for storage testing according to some embodiments of the present disclosure.

FIG. 2 shows a flow chart of method 200 for storage testing according to some embodiments of the present disclosure. By using method 200, the most effective storage IO load combination change mode may be obtained based on the reinforcement learning, aiming to improve the efficiency of storage system testing. Method 200 may be applied to an electronic device with processing testing performance, such as a personal computer (PC), a computer cluster, and a server. The embodiments of the present disclosure do not make any limitation to the device type and the like of the electronic device that implements method 200. It should be understood that, in the embodiments of the present disclosure, the main body implementing method 200 may be implemented by one entity device, or may be implemented jointly by a plurality of entity devices. It is understandable that the main body implementing method 200 may be a logical function module in an entity device, or may be a logical function module composed of a plurality of entity devices. It should be understood that, in the following embodiments of the present disclosure, the steps in the method provided in the embodiments of the present disclosure may be performed by one entity device, or the steps in the method provided in the embodiments of the present disclosure may be performed by a plurality of entity devices cooperatively, which is not limited in the embodiments of the present disclosure. It should be understood that method 200 may further include additional blocks that are not shown and/or may omit blocks that are shown, and the scope of the present disclosure is not limited in this regard.

At block 201, a first state of a storage system is acquired. The first state may include a plurality of description parameters, such as one or more of the following parameters: hardware information, platform information, and drive information of a storage testing system, load type, load thread, and load profile of storage IO, and total IOPS, CPU utilization, memory utilization, IO latency, and current event during running of the storage testing, the load profile including parameters such as deduplication, block size, and read/write ratio, and the current event including events such as no event, RAID rebuilding, system space exhaustion and recovery, snapshot creation/deletion, data simplification tag on/off, synchronously triggered replication, LUN switching, and storage processor restart. In some embodiments, the first state includes first IO load information. The embodiments of the present disclosure do not impose any specific limitations to the specific representation of the state. For further example descriptions of the states in the environment, reference may be made to a state space described in some embodiments below.

In some embodiments, a test agent may be configured to trigger a reinforcement learning process upon receiving an IO load change request from an automatic testing client terminal. The change request may be automatically triggered to be generated and sent to the test agent when the test performance of a test case does not reach a certain testing target. For example, if it is detected that no vulnerability has been tested for a certain period of time, the automatic testing client terminal may be triggered to send an IO load change request.

In some embodiments, before performing a reinforcement learning training, a custom training strategy is required, including but not limited to: an available state space (such as IO load type, IO load thread, and IO load profile), an available action space (such as available event list, event flag, and special event), an action selection strategy, a reward space, an empirical value function, a testing termination trigger condition, and the like.

At block 202, a first action is taken based on the first state. The first action may cause the first IO load information to be changed to second IO load information. A range of actions that may be taken may be defined by an action space. For an example description of the action space, reference may be made to the action space described in some embodiments below. In some embodiments, taking the first action may include one or more of the following: no action, modifying a load type, modifying a load thread, modifying a load profile, and injecting a special event, where the special event may include RAID rebuilding, system space exhaustion and recovery, snapshot creation/deletion, data simplification tag on/off, synchronously triggered replication, LUN switching, storage processor restart, and the like. The embodiments of the present disclosure do not impose any limitations to actions that can be taken.

In some embodiments, a strategy for taking an action may be set based on a state. For example, in some embodiments, a compromise strategy between exploration and exploitation is adopted, where if the first state is detected to be a known state, a random action is taken with first probability value ε, and the known reserved action for the first state is taken with second probability value 1-ε, where ε is a compromise probability parameter, first probability value ε or second probability value 1-ε is greater than or equal to 0 and less than or equal to 1, first probability value ε may also be configured to decrease over time, and second probability value 1-ε may be configured to increase over time. A random action is taken if it is detected that the first state is an unknown state. The meaning represented by this strategy is that more sufficient experience may be obtained over time, and the test agent more tends to use the experience that has been learned and adopt the known exploitation strategy that maximizes the value function; however, in a case of short time, the test agent has not obtained enough experience, and at this moment, the test agent more tends to take a random action, that is, the exploration strategy.

In some other embodiments, a combined strategy of the exploration strategy and the exploitation strategy is adopted, and if it is detected that the first state is a known state, the known reserved action for the first state is taken. A random action is taken if it is detected that the first state is an unknown state.

In some embodiments, the reserved action for the first state is a known optimal action in the first state. In this embodiment, the selection criteria for the reserved action are not particularly limited.

In block 203, if it is obtained based on the second IO load information that the storage system reaches a preset condition, the first action is updated to be the reserved action for the first state. In some embodiments, a reserved action for a state may be an action that has the greatest impact on the performance of the storage system in that state. In some embodiments, the preset condition may be customized. For example, the preset condition may be set to updating the first action to the reserved action for the first state if it is detected that performing the first action has the greatest impact on the performance of the storage system. In some embodiments, the action that is considered to be able to obtain the greatest long-term expected reward in this state may be selected, which may also be referred to as the optimal action, the best action, the most effective action, and the like.

In some embodiments, storage performance testing is performed based on the second IO load information to obtain a first empirical value, wherein the first empirical value represents a degree of impact on the performance of the storage system by taking the first action in the first state. If the first empirical value is the largest value among a plurality of known empirical values of the first state, the first action is updated to be the reserved action for the first state, and the reserved action for the first state is an action that has the greatest impact on the performance of the storage system in a plurality of actions taken in the first state. The plurality of actions include the first action.

In some embodiments, the empirical value may be represented by a state-action value function Q(s, a), and the test agent may continuously update, through a continuous cycling and iterative learning process, the action that can obtain the maximum empirical value in a certain state. The test agent may be configured to use a reinforcement learning algorithm to update experience Q(s, a) according to a current state, an action, a reward, and a next state $(s_t, a_t, R_{t+1}, s_{t+1})$, so as to find an optimal strategy. Experience Q(s, a) is mapping between states and actions in an environment that seek to maximize long-term rewards. Experience Q(s, a) will continue to be updated over time. The test agent learns continuously over time to pursue an action strategy that maximizes the long-term reward in any state. It should be noted that the embodiments of the present disclosure do not impose any limitations to the reinforcement learning algorithm used by the agent, including but not limited to a Q-learning algorithm, a DQN algorithm, a DDQN algorithm, and the like. For further description of the reward, reference may be made to the description of the reward space in some embodiments below, and the embodiment of the present disclosure does not impose specific limitations to the reward function that is set.

At block 204, an action combination of a plurality of IO load information changes are obtained based on the plurality of reserved actions corresponding to the plurality of states, wherein the plurality of states include the first state. The action combination indicates a combination of a plurality of IO load information changes that have the greatest impact on the performance of the storage system in the plurality of states.

In some embodiments, after obtaining the optimal IO load changes corresponding to a plurality of IO load states through the reinforcement learning, the test agent may recommend, based on the current IO load and based on learned experience, the IO load that has the greatest impact on system performance, including a combination of a plurality of optimal IO load change actions corresponding to the plurality of states, so that it has the greatest impact on the performance of the storage system, so as to find more vulnerabilities in the storage system, thereby improving the efficiency of the storage system testing.

In some embodiments, the parameter indicating the performance of the storage system may include one or more of the following: CPU utilization, memory utilization, IO latency, data miss compare, data path failure, and the like, which is not limited in this embodiment.

In some embodiments, the test agent may continuously perform a reinforcement learning process to find a combination of actions that has the greatest impact on the performance of the storage system. For example, in some embodiments, the first action is taken based on the first state, a second state is obtained, the second state includes a second IO load, and the plurality of states include the second state. A second action is taken based on the second state, the second action causing the second IO load to be changed to a third IO load. The second action is updated to be a reserved action for the second state if it is obtained based on the third IO load information that the storage system reaches the preset condition. The process of continuous learning of other states-actions may be deduced by analogy.

In some embodiments, the test agent repeatedly performs the above reinforcement learning process until a termination condition is triggered. For example, in some embodiments, if it is detected that a preset testing target is achieved, the storage testing may be terminated, and the achievement of the preset testing target may include one or more of the following: reaching a predetermined threshold of CPU utilization, reaching a predetermined threshold of memory utilization, reaching a predetermined threshold of IO latency, or discovering a critical defect that may include a data miss compare or a data path failure. In other embodiments, the storage testing may also be terminated if it is detected that the number of attempts of an action reaches a preset maximum value. In other embodiments, other termination conditions may also be set, and the embodiments of the present disclosure do not specifically limit a triggering condition for terminating the test.

By implementing the method 200, the most effective load combination change mode for the storage system may be found automatically and more accurately, so as to find more vulnerabilities in the storage system, thereby improving the efficiency of the storage system testing.

Some embodiments of the present disclosure are based on the reinforcement learning to find the most effective storage IO load change mode, including a storage IO load level, a storage IO load combination, a storage IO load profile, and a combination thereof, which may enable the storage system to find more vulnerabilities. Implementation details of some embodiments of the present disclosure will be specifically described below with reference to a reinforcement learning structure.

In some embodiments, a state space, an action space, a reward space, and the like for the reinforcement learning may be defined for the storage testing system. The state space is a set of a plurality of states acquired from an environment, the action space is a set of different actions taken, and the reward space is a corresponding reward function.

In the state space, state $S_t$ of the storage system is a vector value under time step t from the state set $S=\{S_1, S_2, \ldots, S_n\}$. State $S_t$ may represent a load state on a system under test (SUT), a runtime system state, another state, and the like at time step t. For example, in one example, state $S_t$ may be defined as the following Formula (1):

$$S_t = \{SUT_{info}, Load_{info}, runtime\_info_t\} \quad \text{Formula (1)}$$

where $SUT_{info}$ is a static value representing test system information, for example, including but not limited to hardware, platform information, drive information, and the like. $Load_{info}$ may represent load information such as a load type, a load worker (that is, the number of threads or processes of a particular type performing I/O actions), and a load profile. $runtime\_info_t$ may represent a testing runtime state, such as a performance state, including but not limited to an average total number of input/output operations per second (IOPS), an average CPU utilization, and a rounded-off value of an average latency during performing of the test case.

Code shown below describes related information of example $S_t$.

```
<SUT_info>
System Hardware :<hardware>
System Platform: <platform>
Drive Information:<Drive>|
<Load_info>
   <Load_type>
   Block_IO
   File_IO
   ESXi_IO
   <Load_workers>
   Block_IO = 4
   File_IO =8
   ESXi_IO =32
   <Load_Profile>
   Profile1 : dedup=random,blocksize=8k,readratio=70
<runtime_info>
average_total_IOPS=60(K)
average_CPU_Util=70 (percentage)
```

-continued

```
average_Latency=2ms
current_event = NA
```

The storage system in this example has three types of IO loads: a block IO, a file IO, and a virtual machine IO. The number of IO threads for the block IO is 4, the number of IO threads for the file IO is 8, and the number of IO threads for the virtual machine IO is 32. The load profile is configured as "Profile 1," and Profile 1 is configured with random deduplication, an 8 KB block size, and a 70% read-write ratio. During the testing runtime, the average total IOPS is 60, the average CPU utilization is 70%, the rounded-off value of the average latency is 2 ms, and the like. It is understandable that the above state space examples will not limit other embodiments of the present disclosure, and other embodiments may include more, fewer, or different states, the settings of the state space may be adjusted according to the situation, and the scope of the present disclosure is not limited in this regard.

The storage system observes current state $S_t$ at each time step t and selects action $A_t$ based on the action selection strategy. The action space includes a plurality of actions that may be selected, including but not limited to: changing the IO load by modifying a load configuration parameter such as a load worker "Load_worker" or a load profile "Load_profile"; and injecting some special events that may trigger system failures such as an IO path error, high latency, or system hang, such as RAID rebuilding, system space exhaustion and recovery, snapshot creation/deletion, data simplification tag on/off, synchronously triggered replication, logic unit access (LUN) switching, and storage processor restart.

An example of an action space is shown in the following Table 1.

TABLE 1

| Serial number | Action modification | Previous IO load | New IO load | New event |
|---|---|---|---|---|
| 1 | Worker1 + 1→Worker1 | Load_worker = (4, 8, 32)<br>Load_profile = profile1 | Load_worker = (5, 8, 32)<br>Load_profile = profile1 | None |
| 2 | Worker1 − 1→Worker1 | Load_worker = (4, 8, 32)<br>Load_profile = profile1 | Load_worker = (3, 8, 32)<br>Load_profile = profile1 | None |
| 3 | Worker2 + 1→Worker2 | Load_worker = (4, 8, 32)<br>Load_profile = profile1 | Load_worker = (4, 9, 32)<br>Load_profile = profile1 | None |
| 4 | Worker2 − 1→Worker2 | Load_worker = (4, 8, 32)<br>Load_profile = profile1 | Load_worker = (4, 7, 32)<br>Load_profile = profile1 | None |
| 5 | Worker3 − 1→Worker3 | Load_worker = (4, 8, 32)<br>Load_profile = profile1 | Load_worker = (4, 9, 31)<br>Load_profile = profile1 | None |
| 6 | Worker3 + 1→Worker3 | Load_worker = (4, 8, 32)<br>Load_profile = profile1 | Load_worker = (4, 8, 33)<br>Load_profile = profile1 | None |
| 7 | Profile1 → Profile 2 | Load_worker = (4, 8, 32)<br>Load_profile = profile1 | Load_worker = (4, 8, 32)<br>Load_profile = profile2 | None |
| 8 | Profile1 → Profile 3 | Load_worker = (4, 8, 32)<br>Load_profile = profile1 | Load_worker = (4, 8, 32)<br>Load_profile = profile3 | None |
| 9 | Storage processor restart→current event | Load_worker = (4, 8, 32)<br>Load_profile = profile1 | Load_worker = (4, 8, 32)<br>Load_profile = profile1 | Storage processor restart |
| 10 | Data simplification tag on/off→current event | Load_worker = (4, 8, 32)<br>Load_profile = profile1 | Load_worker = (4, 8, 32)<br>Load_profile = profile1 | Data simplification tag on/off |
| 11 | Space exhaustion and recovery→ current event | Load_worker = (4, 8, 32)<br>Load_profile = profile1 | Load_worker = (4, 8, 32)<br>Load_profile = profile1 | Space exhaustion and recovery |
| 12 | No action | Load_worker = (4, 8, 32)<br>Load_profile = profile1 | Load_worker = (4, 8, 32)<br>Load_profile = profile1 | None |

The action space of the example includes 12 actions. The load configuration Load_info={Load_type=(Block_IO, File_IO, ESXi_IO), Load_worker=(4, 8, 32), Load_Profile=profile1}. This indicates that the storage system has three types of IO loads: a block IO, a file IO, and a virtual machine IO. The number of IO threads 1 (workers) of the block IO is 4, the number of IO threads 2 of the file IO is 8, the number of IO threads 3 of the virtual machine IO is 32, that is, worker1=4, worker2=8, and worker3=32. The load profile is configured as "Profile 1" (it may be assumed that there are at least 3 profiles available). Performing the action may be adding or subtracting worker1, worker2, or worker3 (such as actions of serial numbers 1 to 6), or changing profiles (such as actions of serial numbers 7 and 8), or injecting special events (such as actions of serial numbers 9 to 11)), or not performing any operation (such as the action of serial number 12), or the like. In the action space of this example, special events that are set may cause system failures. The list of events may include storage processor restart, data simplification tag on/off, space exhaustion and recovery, and none. If the current event is None, it indicates that no special event is triggered. If the current event is storage processor restart, data simplification tag on/off, or space exhaustion and recovery, it indicates that the corresponding special event is triggered. Event tags may be used for identifying whether these special events need to be triggered to "make system noise." For example, in this example, if the event tag is ON, the action space will include 12 actions as listed in Table 1 with serial numbers 1 to 12. If the event label is OFF, the action space will include 9 actions listed in Table 1 with serial numbers 1 to 8 and 12. It is understandable that the above action space examples do not limit other embodiments of the present disclosure. In other embodiments, the action space may include more, fewer, or different actions, and the settings of the action space may be adjusted according to the situation. The scope of disclosure is not limited in this regard.

In some embodiments, the reward space may be reward function R, and a value of reward function R may indicate the impact of the storage IO load change mode on the performance of the storage system. The storage system performance may be represented by one or more of the following indicators, including CPU utilization, memory utilization, IO latency, data miss compare, data path failure, or the like. In some examples, a higher CPU utilization, a higher memory utilization, a longer IO latency, occurrence of data miss compare or data path failure, or the like indicates a poorer performance of the storage system, and larger value of reward function R. In some embodiments, reward function R(t+1) exemplified by the following Formula (2) may be used:

$$R(t+1) = W1*\left(\frac{Latency_{average}}{Latency_{threshold}}\right)^2 + W2*\left(\frac{CPU_{average}}{CPU\_threshold}\right)^2 + W3*\left(\frac{Memory\_average}{Memory\_threshold}\right)^2 + W4*Test\_Result\_Score$$

Formula (2)

where $\Sigma_{i=1}^{N} Wi=1$. Wi represents a weight of the factor i, and a value of Wi depends on a testing focus. For example, if a latency index is sensitive, the value of weight W1 may be set to be large. R(t+1) is the reward at time step t, Latency_average is the average latency at time step t, CPU_average is the average CPU utilization at time step t, Memory_average is the average memory utilization at time step t, and Latency_threshold, CPU_threshold, and Memory_threshold represent a predefined latency threshold, CPU utilization threshold, and memory utilization threshold, respectively. Test_Result_Score indicates a severity level of a vulnerability during the performance testing, for example, if a data miss compare (the most critical vulnerability in the storage testing) causes the system performance testing to fail, the value of Test_Result_Score will be very high. A higher average CPU utilization, higher average memory utilization, longer average IO latency, or more severer vulnerability results in a greater value of reward function R, which means a higher stress applied to the storage system may result a more severe vulnerability detected by this test. It is understandable that the above examples of reward space do not limit other embodiments of the present disclosure. In other embodiments, the reward space may include other reward functions, and the setting of the reward space may be adjusted according to the situation. The scope of the present disclosure is not limited in this regard.

Figure 3:
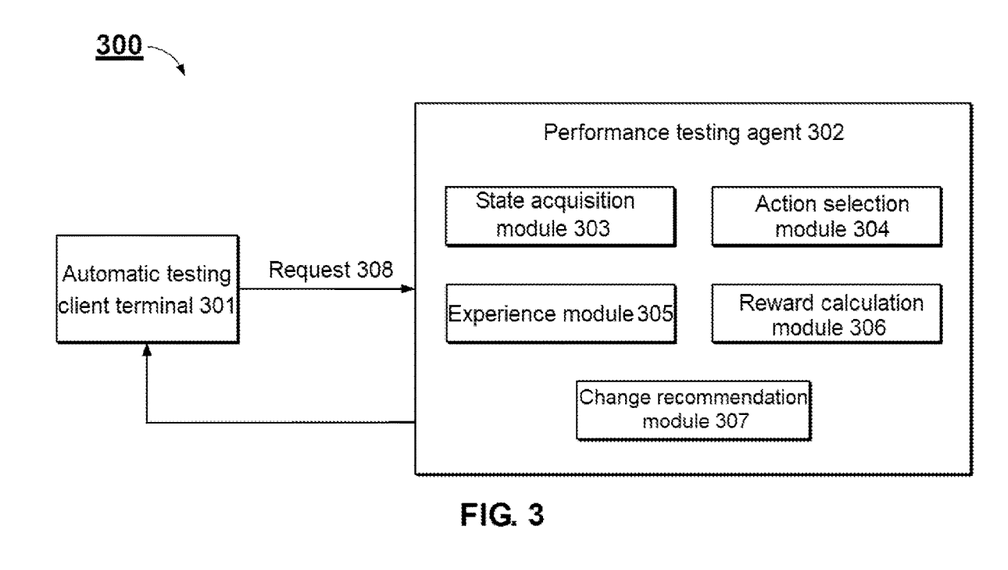
FIG. 3 shows a schematic diagram of functional modules of a storage testing system according to some embodiments of the present disclosure.

FIG. 3 shows a schematic diagram of functional modules of storage testing system 300 according to an embodiment of the present disclosure. In the embodiment of the present application, storage testing system 300 may be divided into functional modules. For example, various functions of storage testing system 300 may be divided into various functional modules, or two or more functions of storage testing system 300 may be integrated into one functional module, which is not limited in this embodiment. Storage testing system 300 may include automatic testing client terminal 301 and performance testing agent 302. Performance testing agent 302 may include state acquisition module 303, action selection module 304, experience module 305, reward calculation module 306, change recommendation module 307, and the like. The functional modules may be implemented by software, hardware, or a combination of both.

Automatic testing client terminal 301 may be configured to send request 308 to performance testing agent 302, request 308 may be an IO load change request, and request 308 may be automatically triggered to be generated when the test performance of a test case does not meet a certain testing target and sent to performance testing agent 302. For example, if it is detected that no vulnerability has been tested for a certain period of time, automatic testing client terminal 301 may be triggered to send an IO load change request.

Performance testing agent 302 may be configured as an automatic testing service, which continuously and automatically learns to change an IO load change strategy to achieve a testing target. Performance testing agent 302 may further be configured to, in response to receiving request 308, be triggered to change an IO load, and initiate a reinforcement learning process. Performance testing agent 302 may further be configured to terminate the testing process upon detecting that the testing target has been achieved, or that the number of attempts exceeds a predetermined maximum value, or another termination condition is met.

State collection module 303 may be configured to collect states, for example, including static information and runtime information of an SUT described in the state space of the previous embodiment, for example, a runtime performance matrix such as IO latency/IOPS/CPU utilization/memory utilization, and runtime or static IO load setting information such as IO load types, the number of IO load working threads corresponding to the IO load types, and load profiles. After action $A_t$ is taken, a new IO load will be generated, performance testing will be performed using the new IO load, and state acquisition module 303 may obtain next state $S_{t+1}$.

Action selection module 304 may be configured to observe current state $S_t$ and provide IO load change action $A_t$. For specific actions, reference may be made to the foregoing descriptions related to the action space. Actions may be selected by using an exploration strategy, an exploitation strategy, a compromise strategy between exploration and exploitation, and a combined strategy thereof. For example, in some embodiments, a combined strategy may be employed. If state $S_t$ is found to be a known state in experience module 305, the compromise strategy between exploration and exploitation is used, that is, the exploration strategy is adopted with probability ε, and the exploitation strategy is adopted with probability 1-ε. Compromise probability parameter ε(t) may be set to a value between 0 and 1 (which may include boundary values), where a value of the ε(t) may be configured to decrease over time, indicating that more experience may be obtained over time, and the agent more tends to use learned experience and adopt the known exploitation strategy that maximizes the value function. However, in a case of short time, the agent has not obtained enough experience, and at this moment, the agent more tends to take a random action, that is, the exploration strategy. If state $S_t$ is not found in experience module 305, the new state $S_t$ is added to experience module 305 and the exploration strategy (which may also be expressed as setting ε(t) to 1) is used, indicating that the agent takes a completely random action when in a completely new state to try to explore. Based on current states s(t) and ε(t), action selection module 304 with probability ε selects a random action, otherwise, takes the best action, that is, uses the exploitation strategy. The best action is an action with the highest Q(s, a) value that has been observed so far.

Experience module 305 may be configured to use a reinforcement learning algorithm to update experience Q(s, a) according to a current state, action, reward, and next state $(s_t, a_t, R_{t+1}, s_{t+1})$, so as to find an optimal strategy. Experience Q(s, a) is mapping between states and actions in an environment that seek to maximize long-term rewards. Experience Q(s, a) will continue to be updated over time. This embodiment does not impose any limitations to the reinforcement learning algorithm used to find the optimal strategy, including but not limited to Q-learning algorithm, DQN algorithm, DDQN algorithm, and the like. The scope of the present disclosure is not limited in this regard.

Reward calculation module 306 may be configured to calculate a reward for taking action $A_t$ in state $S_t$ according to a testing target, thereby helping to find out which IO load change mode has the greatest impact on the system performance. For details, reference may be made to the foregoing descriptions related to the reward space. After action $A_t$ is taken, a new IO load will be generated, performance testing will be performed using the new IO load, and reward calculation module 306 may obtain reward $R_{t+1}$ according to a reward function.

Change recommendation module 307 may be configured to recommend, based on the current IO load and learned experience, an IO load change mode that has the greatest impact on the system performance, including a combination of a plurality of optimal IO load change actions corresponding to a plurality of states.

It is understandable that the specific implementation of various functions included in the above various modules may be implemented with reference to the descriptions in the foregoing other embodiments. The modules and/or units may be implemented in part or in whole as hardware modules, software modules, firmware modules, or any combination thereof. In particular, the procedure, method, or process described in some embodiments may be implemented by hardware in a storage system or a host corresponding to the storage system or another computing device independent of the storage system.

Implementing the functional modules of storage testing system 300 provided in this embodiment can automatically and more accurately find the most effective IO load combination change mode for the storage system, so as to find more vulnerabilities in the storage system, thereby improving the efficiency of storage system testing.

Figure 4:
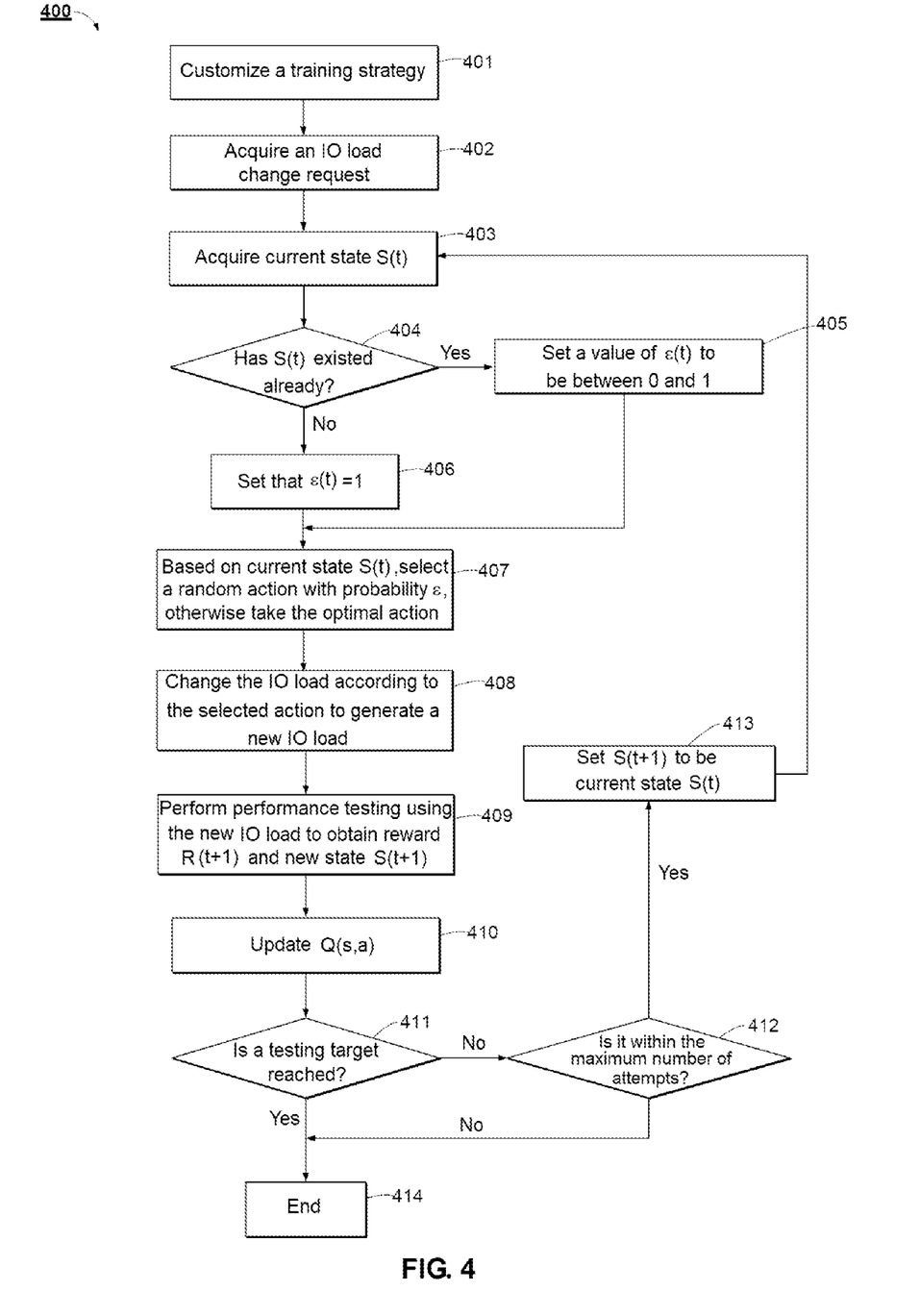
FIG. 4 shows a flow chart of a method for storage testing according to some embodiments of the present disclosure.

With reference to the described embodiments of storage testing system 300, FIG. 4 shows a flow chart of method 400 for storage testing according to some embodiments, and the method flow is a more specific example flow.

At block 401, a training strategy is customized. In some embodiments, before performing a reinforcement learning training, a custom training strategy is required, including but not limited to: an available state space (such as IO load type, IO load thread, and IO load profile), an available action space (such as available event list, event flag (on or off), and special event), an action selection strategy, a reward space, an empirical value function, a testing termination trigger condition, and the like.

At block 402, an IO load change request is acquired. In some embodiments, performance testing agent 302 may receive an IO load change request from automatic testing client terminal 301, and the IO load change request may be automatically triggered to be generated when the testing performance of a test case does not reach a certain testing target and sent to performance testing agent 302. For example, if it is detected that no vulnerability has been tested for a certain period of time, automatic testing client terminal 301 may be triggered to send an IO load change request.

At block 403, a current state S(t) is acquired. In some embodiments, state collection module 303 may be configured to collect current state S(t) of current time step t, for example, including static information and runtime information of the SUT described in the state space of the foregoing embodiment.

At block 404, it is determined whether S(t) has existed. If yes, the procedure turns to block 405, and if no, the procedure turns to block 406. In some embodiments, a strategy for taking an action may be selected.

At block 405, a value of ε(t) is set to be between 0 and 1. In some embodiments, if state S(t) is found to be a known state in experience module 305, the compromise strategy between exploration and exploitation is used, that is, the exploration strategy is taken with probability ε, and the exploitation strategy is taken with probability 1-ε. Compromise probability parameter ε(t) may be set to a value between 0 and 1, where a value of the ε(t) may be configured to decrease over time, indicating that over time, more experience may be obtained, and the agent more tends to use learned experience and adopt the known exploitation strategy that maximizes the value function, but in a case of a short time, the agent has not obtained enough experience, and the agent more tends to take a random action, that is, adopts the exploration strategy, indicating that the agent takes a completely random action when in a completely new state to try to explore.

At block 406, it is set that ε(t)=1. In some embodiments, if no state S(t) is found in experience module 305, the new state S(t) is added to experience module 305, and the exploration strategy is used, which may also be indicated as setting ε(t) to 1.

At block 407, based on current state S(t), a random action is selected with probability ε, otherwise, the best action is taken. In some embodiments, based on current states S(t) and ε(t), action selection module 304 with probability ε selects a random action, otherwise, takes the best action, that is, uses the exploitation strategy. The best action is an action with the highest Q(s, a) value that has been observed so far.

At block 408, the IO load is changed according to the selected action to generate a new IO load. In some embodiments, after an action is taken, a new IO load is generated.

At block 409, performance testing is performed with the new IO load to obtain reward R(t+1) and new state S(t+1). In some embodiments, reward calculation module 306 may be configured to calculate a reward for taking action a(t) in state S(t) according to a testing target to help find which IO load change mode has the greatest impact on the system performance. For details, reference may be made to the foregoing descriptions related to the reward space. After action a(t) is taken, a new IO load will be generated, performance testing will be performed using the new IO load, and reward calculation module 306 may obtain reward R(t+1) according to the reward function.

At block 410, Q(s, a) is updated. In some embodiments, experience module 305 may be configured to use a reinforcement learning algorithm to update experience Q(s, a) according to a current state, an action, a reward, and a next state ($s_t$, $a_t$, $R_{t+1}$, $s_{t+1}$), so as to find an optimal strategy. Experience Q(s, a) is mapping between states and actions in an environment that seek to maximize long-term rewards. Experience Q(s, a) will continue to be updated over time. This embodiment does not impose any limitations to the reinforcement learning algorithm used to find the optimal strategy, including but not limited to Q-learning algorithm, DQN algorithm, DDQN algorithm, and the like. The scope of the present disclosure is not limited in this regard.

At block 411, it is determined whether the testing target is achieved. If yes, the procedure turns to block 414, and if no, the procedure turns to block 412. In some embodiments, performance testing agent 302 may further be configured to terminate the testing process upon detecting that the testing target has been achieved.

At block 412, it is determined whether it is within the maximum number of attempts. If yes, the procedure turns to block 413, and if no, the procedure turns to block 414. In some embodiments, performance testing agent 302 may further be configured to terminate the testing process upon detecting that the number of attempts exceeds a predetermined maximum value.

At block 413, S(t+1) is set to current state S(t), and the procedure turns to block 403. In some embodiments, the new state is taken as the current state, and the testing learning process of blocks 407 to 412 is repeated to automatically and more accurately find the most effective IO load combination change mode for the storage system.

At block 414, the procedure ends. A termination condition that triggers the end of the testing may further include other termination conditions other than block 411 and block 412, which is not limited in this embodiment. However, regardless of whether the testing target is achieved, the experience of each attempted action will benefit future decisions of the agent.

It should be understood that method 400 may further include additional blocks that are not shown and/or may omit blocks that are shown, and the scope of the present disclosure is not limited in this regard.

Figure 5:
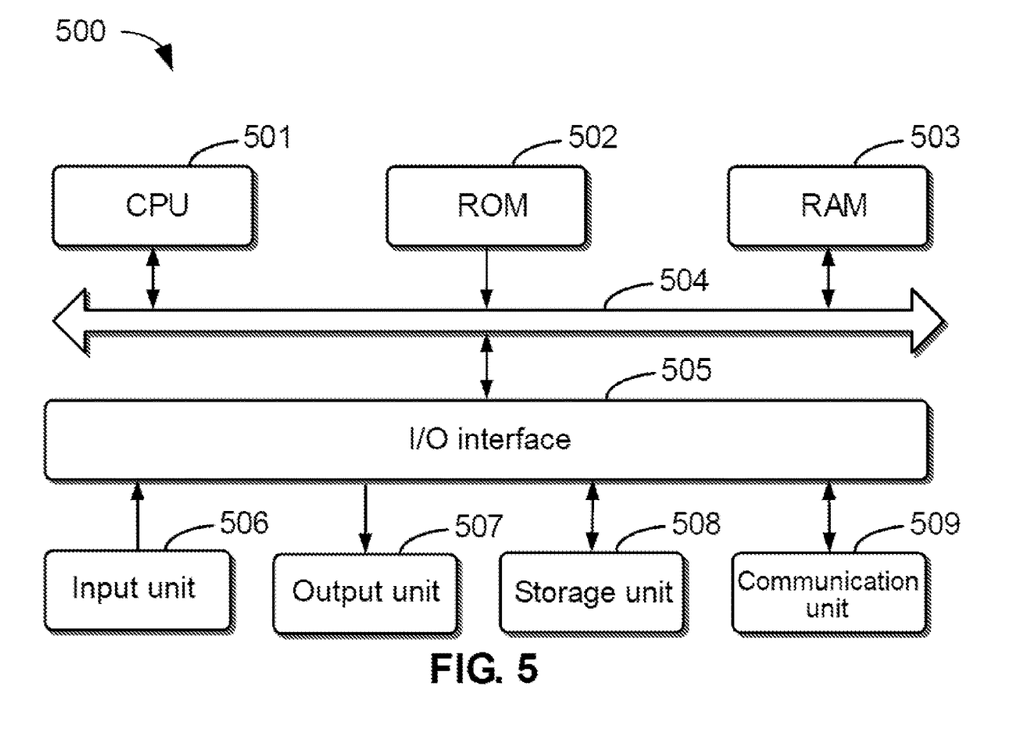
FIG. 5 is a schematic structural diagram of a device that can be configured to implement embodiments of the present disclosure.

FIG. 5 is a schematic structural diagram of example device 500 that can be configured to implement some embodiments of the present disclosure. Device 500 may be configured to implement the above edge node or repository server. As shown in FIG. 5, device 500 includes central processing unit (CPU) 501 which may perform various appropriate actions and processing according to computer program instructions stored in read-only memory (ROM) 502 or computer program instructions loaded from storage unit 508 to random access memory (RAM) 503. Various programs and data required for operations of device 500 may also be stored in RAM 503. CPU 501, ROM 502, and RAM 503 are connected to each other through bus 504. Input/output (I/O) interface 505 is also connected to bus 504.

A plurality of components in device 500 are connected to I/O interface 505, including: input unit 506, such as a keyboard and a mouse; output unit 507, such as various types of displays and speakers; storage unit 508, such as a magnetic disk and an optical disc; and communication unit 509, such as a network card, a modem, and a wireless communication transceiver. Communication unit 509 allows device 500 to exchange information/data with other devices via a computer network, such as the Internet, and/or various telecommunication networks.

Processing unit 501 may execute the various methods and/or processing described above, such as method 200, system 300, and method 400. For example, in some embodiments, system 300 may be implemented as a computer software program that is tangibly included in a machine-readable medium such as storage unit 508. In some embodiments, part of or all the computer program may be loaded and/or installed to device 500 via ROM 502 and/or communication unit 509. When the computer program is loaded onto RAM 503 and executed by CPU 501, one or more steps of method 200 described above may be performed. Alternatively, in other embodiments, CPU 501 may be configured to perform method 200 in any other suitable manners (e.g., by means of firmware).

The functions described herein above may be performed, at least in part, by one or a plurality of hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

In some embodiments, the methods and processes described above may be implemented as a computer program product. The computer program product may include a computer-readable storage medium on which computer-readable program instructions for performing various aspects of the present disclosure are loaded.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code can be completely executed on a machine, partially executed on a machine, partially executed on a machine as an independent software package and partially executed on a remote machine, or completely executed on a remote machine or a server.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combinations thereof.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in a reverse order, depending on the functions involved. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined herein is not necessarily limited to the particular features or actions described above. Rather, the specific features and actions described above are merely example forms of implementation.

Various embodiments of the present disclosure have been described above. The foregoing description is illustrative rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for storage testing, comprising:
   acquiring a first state of a storage system comprising first input/output (IO) load information;
   taking a first action based on the first state, the first action causing the first IO load information to be changed to second IO load information;
   updating the first action to be a reserved action for the first state if it is obtained based on the second IO load information that the storage system reaches a preset condition; and
   obtaining an action combination of a plurality of IO load information changes based on a plurality of reserved actions corresponding to a plurality of states, wherein the plurality of states comprise the first state.

2. The method according to claim 1, wherein the updating the first action to be a reserved action for the first state if it is obtained based on the second IO load information that the storage system reaches a preset condition comprises:
   performing storage performance testing based on the second IO load information to obtain a first empirical value, wherein the first empirical value represents a degree of impact on the performance of the storage system by taking the first action in the first state; and
   updating the first action to be the reserved action for the first state if the first empirical value is a largest value among a plurality of known empirical values of the first state, wherein the reserved action for the first state is an action that has a greatest impact on the performance of the storage system among a plurality of actions taken in the first state, the plurality of actions comprise the first action, and the action combination indicates a combination of the plurality of IO load information changes that have greatest impacts on the performance of the storage system in the plurality of states.

3. The method according to claim 2, wherein parameters indicating the performance of the storage system comprise one or more of the following: central processing unit (CPU) utilization, memory utilization, IO latency, data miss compare, and data path failure.

4. The method according to claim 1, wherein the reserved action for the first state is a known optimal action in the first state, and the taking a first action based on the first state comprises:
   taking a random action with a first probability value and taking the reserved action for the first state with a second probability value if it is detected that the first state is a known state, wherein the first probability value and the second probability value are greater than or equal to 0 and less than or equal to 1, the first probability value is configured to decrease over time, and the second probability value is configured to increase over time; and
   taking a random action if it is detected that the first state is an unknown state.

5. The method according to claim 1, wherein the reserved action for the first state is a known optimal action in the first state, and the taking a first action based on the first state comprises:
   taking the reserved action for the first state if it is detected that the first state is a known state; and
   taking a random action if it is detected that the first state is an unknown state.

6. The method according to claim 1, further comprising:
   taking the first action based on the first state, and obtaining the second state, the second state comprising the second IO load information, and the plurality of states comprising the second state;
   taking a second action based on the second state, the second action causing the second IO load information to be changed to third IO load information; and
   updating the second action to be a reserved action for the second state if it is obtained based on the third IO load information that the storage system reaches the preset condition.

7. The method according to claim 1, further comprising:
   terminating the storage testing if it is detected that a preset testing target is achieved, and the achievement of the preset testing target comprising one or more of the following: reaching a predetermined threshold of central processing unit (CPU) utilization, reaching a predetermined threshold of memory utilization, reaching a predetermined threshold of IO latency, or discovering a critical defect comprising a data miss compare or a data path failure; and
   terminating the storage testing if it is detected that a number of attempts of the first action reaches a preset maximum value.

8. The method according to claim 1, wherein the first state further comprises one or more of the following parameters: hardware information, platform information, and drive information of a storage testing system, load type, load thread, and load profile of storage IO, and total number of input/output operations per second (IOPS), central processing unit (CPU) utilization, memory utilization, IO latency, and current event during running of the storage testing, the load profile comprising deduplication, block size, and read/write ratio, and the current event comprising no event, redundant array of independent disks (RAID) rebuilding, system space exhaustion and recovery, snapshot creation/deletion, data simplification tag on/off, synchronously triggered replication, logical unit access (LUN) switching, and storage processor restart.

9. The method according to claim 1, wherein the taking a first action comprises one or more of the following: no action, modifying a load type, modifying a load thread, modifying a load profile, and injecting a special event, the special event comprising redundant array of independent disks (RAID) rebuilding, system space exhaustion and recovery, snapshot creation/deletion, data simplification tag on/off, synchronously triggered replication, logical unit access (LUN) switching, and storage processor restart.

10. The method according to claim 1, wherein the storage system includes a set of storage processors constructed and arranged to perform IO operations on behalf of a set of users.

11. An electronic device for storage testing, comprising:
    a processor; and
    a memory coupled to the processor and having instructions stored therein, wherein the instructions, when executed by the processor, cause the electronic device to perform operations comprising:
      acquiring a first state of a storage system comprising first input/output (IO) load information;
      taking a first action based on the first state, the first action causing the first IO load information to be changed to second IO load information;
      updating the first action to be a reserved action for the first state if it is obtained based on the second IO load information that the storage system reaches a preset condition; and obtaining an action combination of a plurality of IO load information changes based on a plurality of reserved actions corresponding to a plurality of states, wherein the plurality of states comprise the first state.

12. The electronic device according to claim 11, wherein the updating the first action to be a reserved action for the first state if it is obtained based on the second IO load information that the storage system reaches a preset condition comprises:
performing storage performance testing based on the second IO load information to obtain a first empirical value, wherein the first empirical value represents a degree of impact on the performance of the storage system by taking the first action in the first state; and
updating the first action to be the reserved action for the first state if the first empirical value is a largest value among a plurality of known empirical values of the first state, wherein the reserved action for the first state is an action that has a greatest impact on the performance of the storage system among a plurality of actions taken in the first state, the plurality of actions comprise the first action, and the action combination indicates a combination of the plurality of IO load information changes that have greatest impacts on the performance of the storage system in the plurality of states.

13. The electronic device according to claim 12, wherein parameters indicating the performance of the storage system comprise one or more of the following: central processing unit (CPU) utilization, memory utilization, IO latency, data miss compare, and data path failure.

14. The electronic device according to claim 11, wherein the reserved action for the first state is a known optimal action in the first state, and the taking a first action based on the first state comprises:
taking a random action with a first probability value and taking the reserved action for the first state with a second probability value if it is detected that the first state is a known state, wherein the first probability value and the second probability value are greater than or equal to 0 and less than or equal to 1, the first probability value is configured to decrease over time, and the second probability value is configured to increase over time; and
taking a random action if it is detected that the first state is an unknown state.

15. The electronic device according to claim 11, wherein the reserved action for the first state is a known optimal action in the first state, and the taking a first action based on the first state comprises:
taking the reserved action for the first state if it is detected that the first state is a known state; and
taking a random action if it is detected that the first state is an unknown state.

16. The electronic device according to claim 11, wherein the operations further comprise:
taking the first action based on the first state, and obtaining the second state, the second state comprising the second IO load information, and the plurality of states comprising the second state;
taking a second action based on the second state, the second action causing the second IO load information to be changed to third IO load information; and
updating the second action to be a reserved action for the second state if it is obtained based on the third IO load information that the storage system reaches the preset condition.

17. The electronic device according to claim 11, wherein the operations further comprise:
terminating the storage testing if it is detected that a preset testing target is achieved, and the achievement of the preset testing target comprising one or more of the following: reaching a predetermined threshold of central processing unit (CPU) utilization, reaching a predetermined threshold of memory utilization, reaching a predetermined threshold of IO latency, or discovering a critical defect comprising a data miss compare or a data path failure; and
terminating the storage testing if it is detected that a number of attempts of the first action reaches a preset maximum value.

18. The electronic device according to claim 11, wherein the first state further comprises one or more of the following parameters: hardware information, platform information, and drive information of a storage testing system, load type, load thread, and load profile of storage IO, and total number of input/output operations per second (IOPS), central processing unit (CPU) utilization, memory utilization, IO latency, and current event during running of the storage testing, the load profile comprising deduplication, block size, and read/write ratio, and the current event comprising no event, redundant array of independent disks (RAID) rebuilding, system space exhaustion and recovery, snapshot creation/deletion, data simplification tag on/off, synchronously triggered replication, logical unit access (LUN) switching, and storage processor restart.

19. The electronic device according to claim 11, wherein the taking a first action comprises one or more of the following: no action, modifying a load type, modifying a load thread, modifying a load profile, and injecting a special event, the special event comprising redundant array of independent disks (RAID) rebuilding, system space exhaustion and recovery, snapshot creation/deletion, data simplification tag on/off, synchronously triggered replication, logical unit access (LUN) switching, and storage processor restart.

20. A computer program product having a non-transitory computer readable medium which stores a set of instructions for storage testing; the set of instructions, when carried out by computerized circuitry, causing the computerized circuitry to perform a method of:
acquiring a first state of a storage system comprising first input/output (IO) load information;
taking a first action based on the first state, the first action causing the first IO load information to be changed to second IO load information;
updating the first action to be a reserved action for the first state if it is obtained based on the second IO load information that the storage system reaches a preset condition; and
obtaining an action combination of a plurality of IO load information changes based on a plurality of reserved actions corresponding to a plurality of states, wherein the plurality of states comprise the first state.

* * * * *